(12) United States Patent
Vinson, Jr.

(10) Patent No.: US 8,465,068 B1
(45) Date of Patent: Jun. 18, 2013

(54) GRILL PANEL REMOVAL TOOL

(76) Inventor: Waymon K. Vinson, Jr., Wingo, KY (US)

( * ) Notice: Subject to any disclaimer, the term of this patent is extended or adjusted under 35 U.S.C. 154(b) by 0 days.

(21) Appl. No.: 13/412,613

(22) Filed: Mar. 5, 2012

(51) Int. Cl.
*A47J 45/10* (2006.01)

(52) U.S. Cl.
USPC .................................. 294/9; 294/32; 294/92

(58) Field of Classification Search
USPC ............... 294/9, 10, 12, 15, 17, 32, 55.5, 92, 294/27.1
See application file for complete search history.

(56) References Cited

U.S. PATENT DOCUMENTS

| | | | | |
|---|---|---|---|---|
| 16,058 A | * | 11/1856 | Hyatt | 294/32 |
| 465,865 A | | 12/1891 | Kuhn | |
| 496,422 A | * | 5/1893 | Ligon | 294/2 |
| 906,677 A | * | 12/1908 | Beasley | 294/32 |
| 1,083,808 A | | 1/1914 | Dunson | |
| 1,177,205 A | * | 3/1916 | Mullin | 294/34 |
| 1,604,050 A | | 10/1929 | Jennings | |
| D218,189 S | | 7/1970 | Demetreon | |
| D218,190 S | * | 7/1970 | Demetreon | D7/690 |
| 3,626,542 A | * | 12/1971 | Despain et al. | 15/236.04 |
| 4,471,985 A | * | 9/1984 | Mahoney | 294/10 |
| 4,482,181 A | | 11/1984 | Shepherd | |
| D341,297 S | | 11/1993 | Martner | |
| D358,073 S | | 5/1995 | Eckert | |
| 5,729,854 A | | 3/1998 | Powers | |
| 5,823,589 A | * | 10/1998 | Johnston | 294/7 |
| 6,000,739 A | | 12/1999 | Zemit et al. | |
| 6,068,314 A | * | 5/2000 | Dorazio et al. | 294/9 |
| 7,533,914 B2 | * | 5/2009 | Rosert et al. | 294/15 |
| 2007/0210595 A1 | * | 9/2007 | Quiles et al. | 294/17 |

* cited by examiner

*Primary Examiner* — Dean Kramer

(57) ABSTRACT

A grill panel removal tool includes a handle that has a first end and a second end. A mount is coupled to the second end of the handle and the mount has a first side and a second side. A pair of holding members extends forwardly from the mount. Each holding member has a proximal end relative to the mount that is attached to the mount. Each of the holding members extends outwardly from the mount away from the handle. Each of the holding members has a curved medial section positioned between a distal section relative to the mount and a proximal section extending from the mount. The holding members engage and lift a grill panel that has spaced parallel bars.

9 Claims, 3 Drawing Sheets

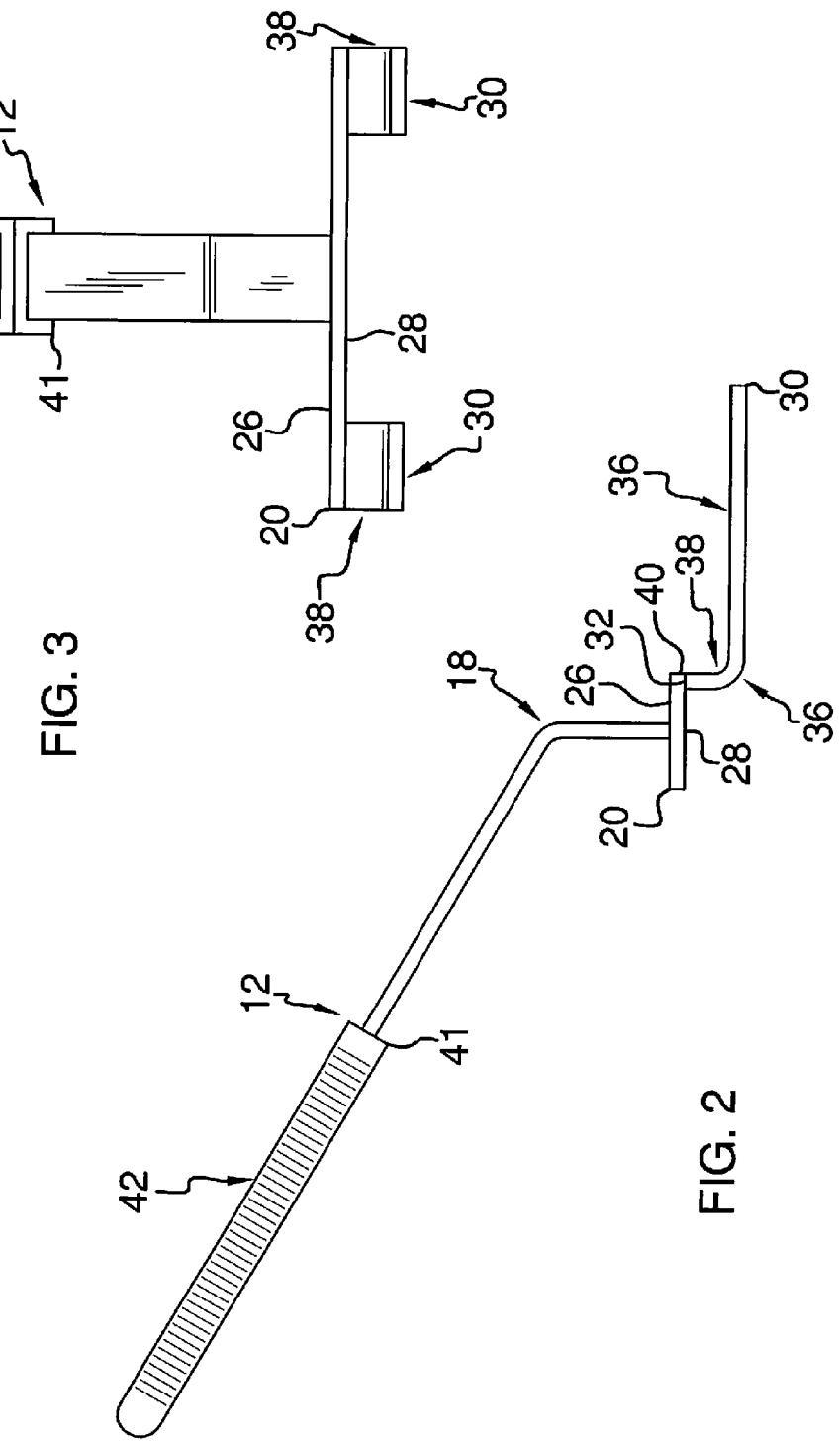

GRILL PANEL REMOVAL TOOL

BACKGROUND OF THE DISCLOSURE

Field of the Disclosure

The disclosure relates to grill removal devices and more particularly pertains to a new grill removal device for removing a grill panel with spaced parallel bars.

SUMMARY OF THE DISCLOSURE

An embodiment of the disclosure meets the needs presented above by generally comprising a handle that has a first end and a second end. A mount is coupled to the second end of the handle and the mount has a first side and a second side. A pair of holding members extends forwardly from the mount. Each holding member has a proximal end relative to the mount that is attached to the mount. Each of the holding members extends outwardly from the mount away from the handle. Each of the holding members has a curved medial section positioned between a distal section relative to the mount and a proximal section extending from the mount. The holding members engage and lift a grill panel that has spaced parallel bars.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 2 is a right side view of an embodiment of the disclosure.

FIG. 3 is a front view of an embodiment of the disclosure.

DESCRIPTION OF THE PREFERRED EMBODIMENT

Figure 1:
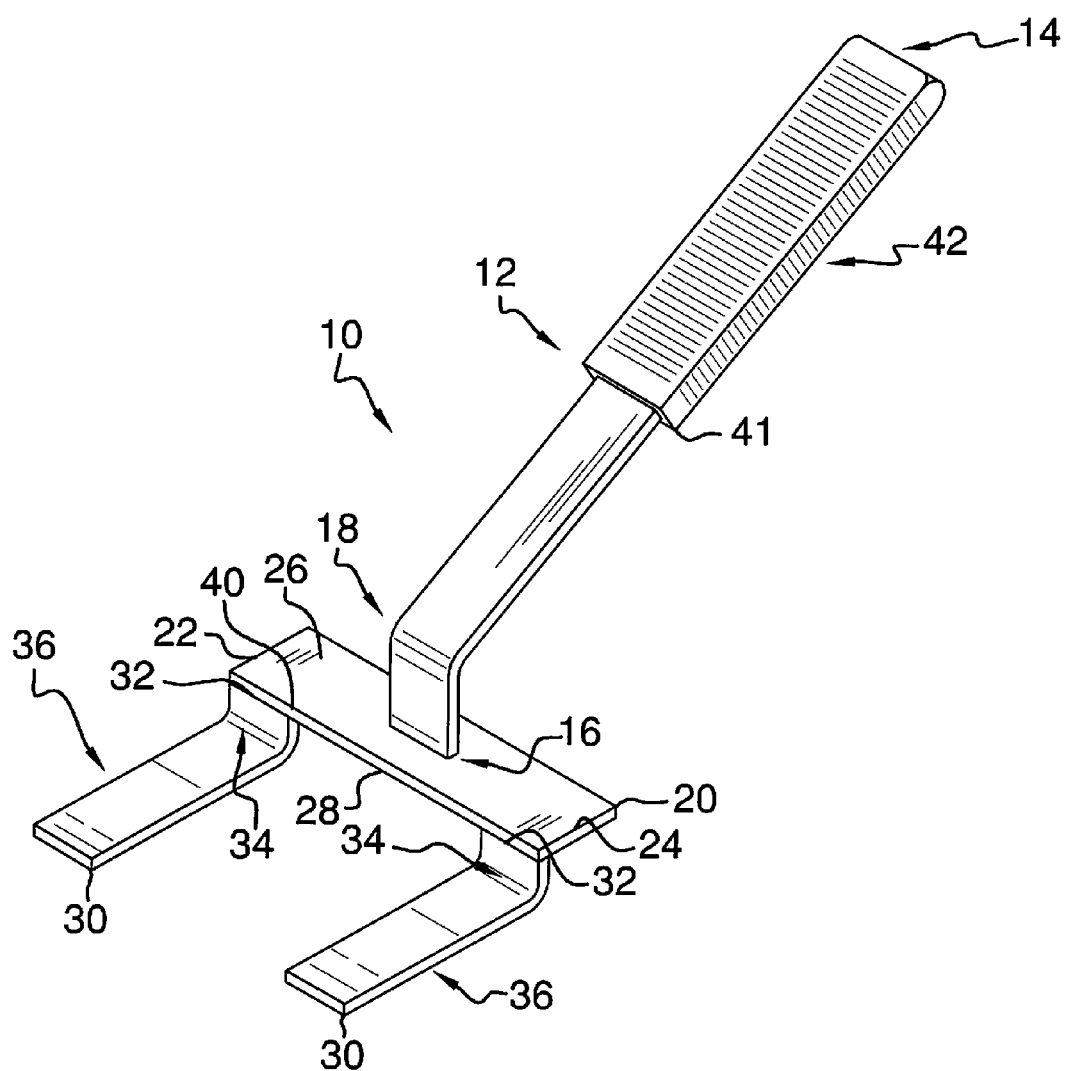
FIG. 1 is a perspective view of a grill panel removal tool according to an embodiment of the disclosure.
Figure 4:
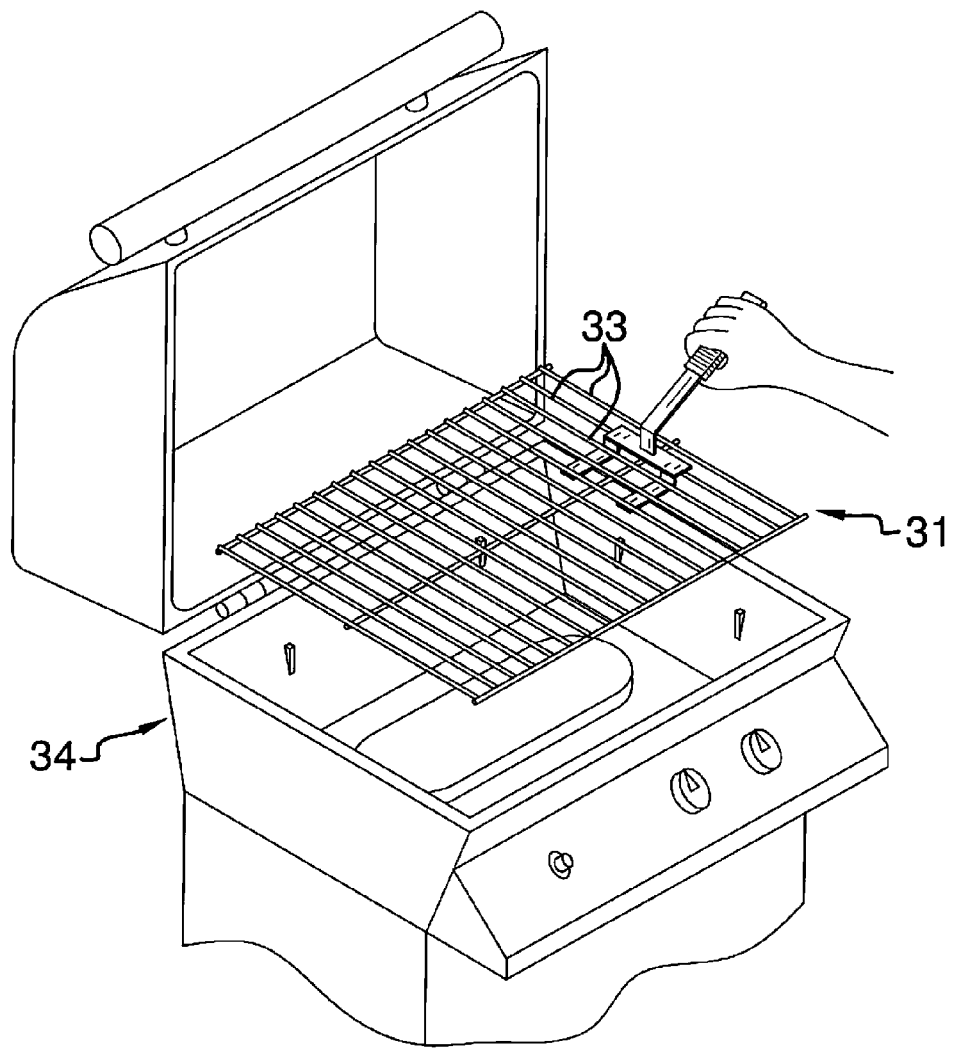
FIG. 4 is an in-use view of an embodiment of the disclosure.

With reference now to the drawings, and in particular to FIGS. 1 through 4 thereof, a new grill removal device embodying the principles and concepts of an embodiment of the disclosure and generally designated by the reference numeral 10 will be described.

As best illustrated in FIGS. 1 through 4, the grill panel removal tool 10 generally comprises a handle 12 that has a first end 14 and a second end 16. The handle 12 has a bent section 18 that is positioned proximate to the second end 16 of the handle. The bent section 18 may be positioned at a point that is between 175 mm and 180 mm from the first end 14 and between 25 mm and 30 mm from the second end 16. A mount 20 is coupled to the second end 16 of the handle 12. The mount 20 has a first side 22 and a second side 24. The mount 20 is planar and has a top face 26 and a bottom face 28. The mount 20 may have a width between 100 mm and 105 mm from the first side 22 to the second side 24. The second end 16 of the handle 12 is coupled to the top face 26 of the mount 20.

A pair of holding members 30 extends forwardly from the mount 20. Each of the holding members 30 may extend forwardly from the mount 20 a distance between 60 mm and 70 mm. Each holding member 30 has a proximal end 32 relative to the mount 20 that is attached to the mount 20. Each of the holding members 30 extends outwardly from the mount 20 away from the handle 12. Each of the holding members 30 has a curved medial section 34 positioned between a distal section 36 relative to the mount 20 and a proximal section 38 extending from the mount 20. The proximal section 38 may extend downwardly from the mount 20 a distance between 12 mm and 14 mm.

Each of the holding members 30 is coupled to and extends from the mount 20 adjacent to an associated one of the first 22 and second 24 sides of the mount 20. Each of the holding members 30 is coupled to the bottom face 28 of the mount 20. Each of the holding members 30 is coupled to the mount 20 adjacent to a forward edge 40 of the mount 20. The distal sections 36 of each the holding members 30 relative to the mount 20 are planar and oriented parallel to the mount 20. The holding members 30 engage and lift a grill panel 31 with spaced parallel bars 33. Each of the holding members 30 and the mount 20 may be comprised of a rigid material.

The bent section 18 directs the first end 14 of the handle 12 rearwardly and away from the top face 26 of the mount 20. The bent section 18 may form an angle between 110 and 130 degrees with respect to the first 14 and second 16 ends. The second end 16 of the handle 12 is coupled to a center of the top face 26 of the mount 20. An elongated grip 41 is coupled to the handle 12. The grip 41 extends around the handle 20 and fully covers a distal portion 42 of the handle 12 relative to the mount 20. The grip 41 extends toward the bent section 18 and may be comprised of a resiliently compressible and heat resistant material.

In use, each of the holding members 30 may be directed downwardly between two of the spaced parallel bars 33. The mount 20 may directed toward a parallel bar 33 until the bar 33 abuts the proximal section 38 of each of the holding members 30. The holding members 30 may be angled upwardly until the distal section 36 abuts a plurality of the parallel bars 33. A bar 33 behind the mount 20 may abut the bottom face 28 of the mount 20 to retain the grill panel 31 on the holding members 30. The grill panel 31 may be lifted upwardly and removed from a grill 34.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A grill panel removal tool, said tool comprising;
   a handle having a first end and a second end;
   a mount coupled to said second end of said handle, said mount having a first side and a second side, said mount being planar having a top face and a bottom face, said second end of said handle being coupled to said top face of said mount; and
   a pair of holding members extending forwardly from said mount, each holding member having a proximal end relative to said mount being attached to said mount, each said holding member extending outwardly from said mount away from said handle, each said holding member having a curved medial section positioned between a distal section relative to said mount and a proximal section extending from said mount whereby said holding members are configured for engaging and lifting a grill panel having spaced parallel bars, said distal section of each said holding member relative to said mount being planar and oriented parallel to said mount.

2. The tool of claim 1, further including an elongated grip being coupled to said handle.

3. The tool of claim 2, further including said grip extending around said handle and fully covering a distal portion of said handle relative to said mount.

4. The tool of claim 1, further including each of said holding members being coupled to and extending from said mount adjacent to an associated one of said first side of said mount and said second side of said mount.

5. The tool of claim 1, further including each of said holding members being coupled to said bottom face of said mount.

6. The tool of claim 5, further including each of said holding members being coupled to said mount adjacent to a forward edge of said mount.

7. The tool of claim 1, further including said handle having a bent section, said bent section being positioned proximate said second end of said handle, said bent section directing said first end of said handle rearwardly and away from said top face of said mount.

8. The tool of claim 1, further including said second end of said handle being coupled to a center of said top face of said mount.

9. A grill panel removal tool, said tool comprising;
   a handle having a first end and a second end, said handle having a bent section, said bent section being positioned proximate said second end of said handle;
   a mount coupled to said second end of said handle, said mount having a first side and a second side, said mount being planar having a top face and a bottom face, said second end of said handle being coupled to said top face of said mount;
   a pair of holding members extending forwardly from said mount, each holding member having a proximal end relative to said mount being attached to said mount, each said holding member extending outwardly from said mount away from said handle, each said holding member having a curved medial section positioned between a distal section relative to said mount and a proximal section extending from said mount whereby said holding members are configured for engaging and lifting a grill panel having spaced parallel bars, each of said holding members being coupled to and extending from said mount adjacent to an associated one of said first side of said mount and said second side of said mount, each of said holding members being coupled to said bottom face of said mount, each of said holding members being coupled to said mount adjacent to a forward edge of said mount, said distal section of each said holding member relative to said mount being planar and oriented parallel to said mount, said bent section directing said first end of said handle rearwardly and away from said top face of said mount, said second end of said handle being coupled to a center of said top face of said mount; and
   an elongated grip being coupled to said handle, said grip extending around said handle and fully covering a distal portion of said handle relative to said mount.

* * * * *